United States Patent
Metcalf et al.

[11] Patent Number: 5,492,403
[45] Date of Patent: Feb. 20, 1996

[54] DROP DOOR CONTROL FOR INTERNAL MIXER

[75] Inventors: John D. Metcalf, Akron; John W. Price, Jr., Uniontown; James M. Rothgery, Mantua; Ronald J. Zaucha, Cuyahoga Falls, all of Ohio

[73] Assignee: The Goodyear Tire & Rubber Company, Akron, Ohio

[21] Appl. No.: 402,836

[22] Filed: Mar. 13, 1995

[51] Int. Cl.⁶ ................................................. B28C 7/16
[52] U.S. Cl. ............................................. 366/77; 366/195
[58] Field of Search ................... 366/43, 69, 77, 366/83–85, 132, 189, 192, 194, 195, 196, 297–301; 425/204, 208, 209

[56] References Cited

U.S. PATENT DOCUMENTS

| | | | |
|---|---|---|---|
| 1,615,525 | 1/1927 | Simpson | 366/43 |
| 2,939,616 | 6/1960 | Whittum et al. | 366/77 X |
| 2,994,100 | 8/1961 | Comes et al. | 366/77 |
| 3,099,040 | 7/1963 | Matsuoka | 366/77 |
| 3,352,542 | 11/1967 | Matsuoka | 366/77 |
| 3,610,585 | 10/1971 | MacLeod | |
| 3,695,587 | 10/1972 | De Marco | 366/77 |
| 4,744,668 | 5/1988 | Nortey | 366/76 |
| 4,910,237 | 3/1990 | Peter | |
| 5,061,078 | 10/1991 | Yada | 366/76 |
| 5,108,188 | 4/1992 | Peter et al. | 366/91 |
| 5,251,977 | 10/1993 | Peter et al. | 366/91 |

FOREIGN PATENT DOCUMENTS

| | | | |
|---|---|---|---|
| 119241 | 3/1920 | United Kingdom | 366/77 |
| 774651 | 5/1957 | United Kingdom | 366/77 |

*Primary Examiner*—Charles E. Cooley
*Attorney, Agent, or Firm*—Frederick K. Lacher; T. P. Lewandowski

[57] ABSTRACT

A method and apparatus for controlling the discharge of an elastomeric material from a high intensity mixing machine having a mixing chamber with two rotors and an outlet with a drop door. The drop door is open when the rotors are in a predetermined preferred position for unloading the mixing machine in response to the positions of indicators on the rotor shafts. Sensors mounted in the wall of the outlet determine when the gate is clear after unloading of the mixed elastomeric material whereby the drop door may be moved into the outlet for closing of the mixing chamber as soon as the unloading is completed.

7 Claims, 3 Drawing Sheets

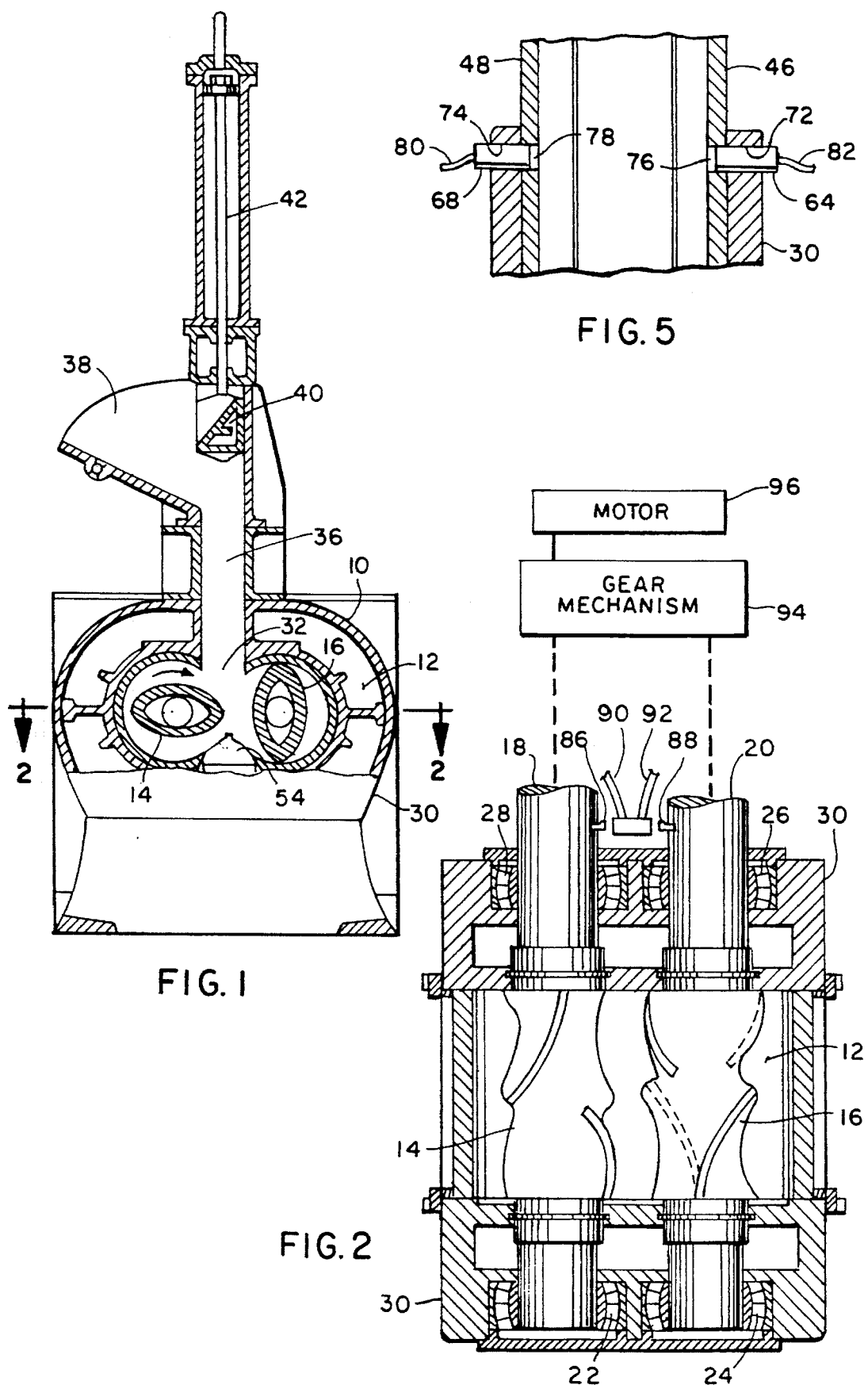

DROP DOOR CONTROL FOR INTERNAL MIXER

BACKGROUND OF THE INVENTION

This invention relates to high intensity internal mixing machines for elastomeric materials. A batch of ingredients to be mixed is fed into a mixing chamber where two rotors rotate at predetermined speeds for predetermined mixing periods after which the mixed material is unloaded through an outlet at the bottom of the mixing chamber. With some rotor designs there has been difficulty unloading the material when the rotors are stopped in positions which tend to retain the mixed material in the mixing chamber. When the mixed material has been unloaded the unloading time has varied causing the drop door in the outlet opening hereinafter referred to as the outlet to be kept open for a period of time equal to the maximum unloading time. This has resulted in the drop door open time being increased from a normal eight to ten seconds to twenty to thirty seconds to ensure the outlet will be clear of the elastomeric material when the drop door is closed. In many cases, the mixer is unloaded in four to five seconds and therefore the lost mixing time may be as much as twenty-five seconds for each mixing cycle. Considering the high cost of these mixers, this unnecessary down time is very costly. On the other hand, when the drop door is closed with the mixed material in the outlet there is a problem with gate jams preventing the door from closing and requiring down time to clear the outlet. For these reasons, timers which have provided dwell time after opening of the outlet have not been adequate to open and close the outlet and to safely achieve the highest use of the mixers.

It has been found that a mixer construction in which sensors are built into the walls of the outlet provide signals as to the passage of the elastomeric material which can be utilized to control the closing of the outlet by movement of the drop door into the outlet opening only after the outlet is cleared. The emptying of the mixer has also been facilitated by controlling the position of at least one of the rotors when the rotation is stopped.

SUMMARY OF THE INVENTION

The present invention is directed to a mixer construction and controls for opening and closing the drop gate for a high intensity mixing machine in an improved manner so as to achieve maximum use of the mixing machine without hang up of the mixed material on rotors or delays in the closing of the drop door after unloading. This is achieved by controls operative in response to the position of the rotors making sure that the rotors are in an optimum relation to each other and to the walls of the mixing chamber when they are stopped for unloading. When the drop door is opened the mixed elastomeric material will fall out of the outlet. These controls are connected to proximity switches on the rotor shafts and to the switches for stopping the rotation of the rotors. Preferably the rotors will be stopped with the wings of at least one of the rotors in a vertical disposition.

The invention is also directed to providing a sensor-transmitter and receiver in the mixing machine outlet to signal whether the mixed material has passed through the outlet and if any of the material is still hung up in the outlet. This information is connected with the controls for opening and closing the outlet so that when the signal indicates the mixed material is not present in the outlet the drop door will be moved back into the outlet. Also when no signal is received that the mixed material has passed through the outlet the drop door will be held in the open position until the hang up of the mixed material in the mixing chamber is cleared. When desired a timer may be used in conjunction with the sensor transmitter and receiver to provide a minimum dwell time of about four to five seconds after opening of the drop door. Then the signal from the sensor is utilized after the dwell time to close the doors so that the opening time is of a predetermined length which may be increased by a signal that the outlet is blocked.

In accordance with one aspect of the invention, there is provided an internal mixer for elastomeric material of the type including a mixing chamber having two rotors with parallel axes of rotation, an inlet opening, an outlet opening, a drop door rotatably supported on a hinged arm for movement into the outlet opening to close the mixing chamber and for movement out of the outlet opening to open the mixing chamber, control apparatus for stopping rotation of the rotors and for releasing the drop door from the outlet opening at a predetermined time, a sensor mounted in the outlet opening to determine the presence of elastomeric material in the outlet opening after the drop door has been released and the drop door being moveable into the outlet opening to close the mixing chamber providing no signal has been received by a sensor indicating the presence of the elastomeric material in the outlet opening.

In accordance with another aspect of the invention, there is provided a method of controlling the operation of an internal mixer for elastomeric material wherein the mixer has a mixing chamber with two rotors, an inlet opening and an outlet opening having a drop door comprising closing the outlet opening with the drop door, feeding a batch of the elastomeric material into the mixing chamber, rotating the two rotors for a predetermined period of time, opening the outlet by opening the drop door, actuating a sensor-transmitter in the outlet opening to determine if the elastomeric material is in the outlet opening by a signal transmitted to a sensor receiver in .the outlet opening and closing the drop door in response to no signal having been received.

BRIEF DESCRIPTION OF THE DRAWINGS

FIG. 1 is a fragmentary sectional view of an internal mixing machine embodying the present invention with the mixing chamber outlet in the closed position;

FIG. 2 is a sectional view taken along line 2—2 in FIG. 1 showing the rotor shafts and proximity switches;

FIG. 5 is a fragmentary sectional view of the mixer outlet and mounting of the microwave transmitter and receiver in the outlet wall taken along line 5—5 of FIG. 4.

DESCRIPTION OF PREFERRED EMBODIMENT

Figure 3:
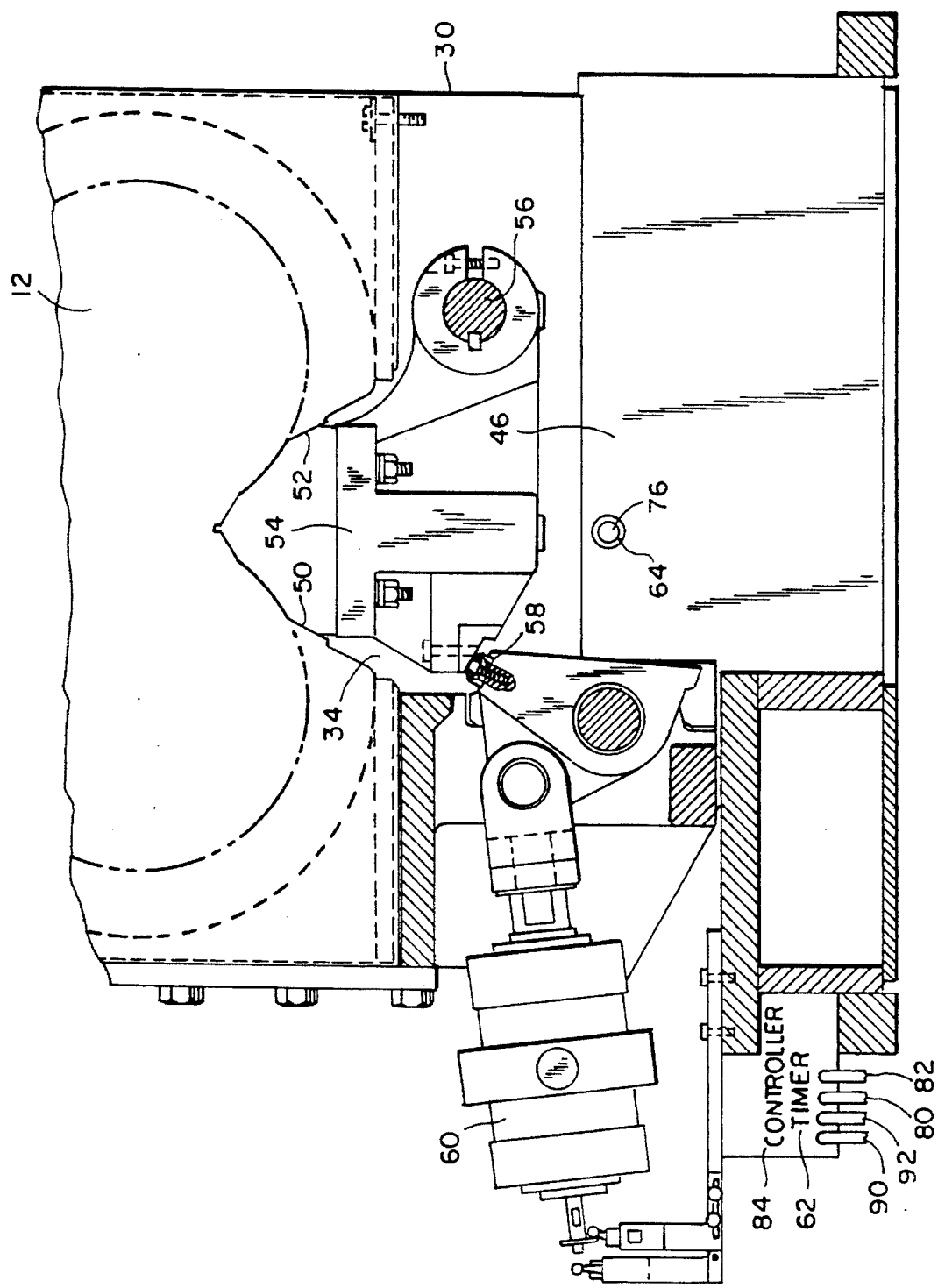
FIG. 3 is an enlarged fragmentary schematic sectional view like FIG. 1 showing the outlet with the drop door in the shut position.

Referring to FIGS. 1 and 2, an internal mixer 10 is shown having a mixing chamber 12 and a pair of rotors 14,16 rotatable about parallel axes on shafts 18,20 and rotatably supported in bearings 22,24,26,28 mounted in a frame 30. The mixing chamber 12 has an inlet opening hereinafter referred to as the inlet 32 and an outlet 34. The inlet 32 is in communication with a chute 36 having a hopper 38 for receiving ingredients to be mixed in the mixing chamber 12.

This mixer 10 is especially adapted for mixing elastomeric materials such as rubber and the like. A ram 40 propelled by a piston cylinder assembly 42 is mounted on the chute 36 and is moveable through the chute to urge the ingredients into the mixing chamber 12.

The outlet 34 has end frames 46,48 and casing edges 50,52 which are engagable by surfaces of a drop door 54 and pivotable about a shaft 56. An actuator not shown is mounted on the frame 30 and rotates the shaft 56 into an open position shown in FIG. 4 or a closed position shown in FIG. 3. When closed the drop door 54 is locked in position by a cam surface 58 actuated by a piston and cylinder assembly 60. The timer 62 may be connected to the actuator for the drop door 54 to determine the interval of time when the drop door remains open.

In accordance with this invention, a microwave transmitter 64 and a microwave receiver 68 are mounted in a wall of the end frames 46,48 at a bed plate of the outlet 34 as shown in FIG. 5. Preferably the material of the end frame 46,48 is of cast steel and the thickness at the holes for the microwave transmitters 64 and receiver 68 is approximately 3¾ inches. The holes 72,74 in the end frames 46,48 are drilled from the inside through to a 2⅝ inch diameter (a tap drill size for 2½ inch NPT). The holes 72,74 are then hand tapped from the outside 2½–8 NPT. The tapped depth should increase gradually so that the microwave sensor 68 may be screwed into the hole and the window comes flush with the inside of the end frames 46,48. The microwave transmitter 64 and microwave receiver 68 have windows 76,78 of Teflon or other suitable material. Cables 80,82 connect the microwave transmitter 64 and microwave receiver 68 with a controller 84 which may be connected to the timer 62.

With reference to FIGS. 1 and 2, the shafts 18,20 have proximity switches 86,88 mounted on shafts 18,20 for determining the position of the rotors 14,16 by utilizing the number of counts for the rotors to make one full revolution and stop the rotation with the right rotor 16 in a vertical position for unloading the mix from the chamber 12. The proximity switches 86,88 may be connected to the timer 62 by cables 90,92. As shown in FIG. 2, the rotors 14,16 mounted on shafts 18,20 are connected to a gear mechanism 94 driven by a motor 96.

Figure 4:
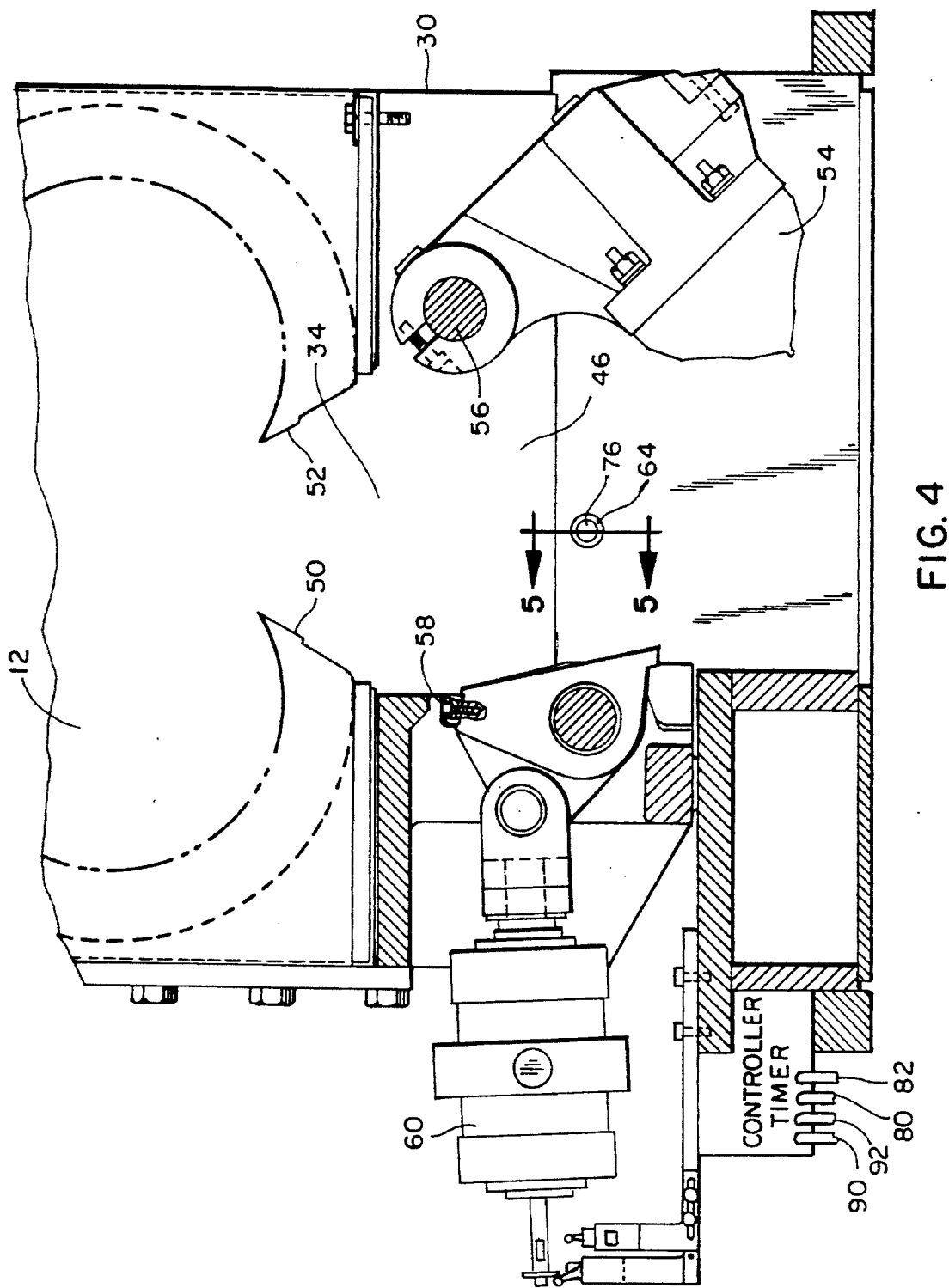
FIG. 4 is a sectional view like FIG. 3 showing the drop door in the open position.

In operation, the mixer 10 is loaded by closing the drop door 54 through an actuator and feeding the ingredients through the hopper 38 into the chute 36 where they are pressed into the mixing chamber by the ram 40. The ingredients are mixed by rotation of the rotors 14,16 for a predetermined period of time after which the rotors are stopped with one of the rotors 16 in a substantially vertical position as determined by the proximity switches 86,88. Next the timer actuates the cam surface 58 out of engagement with the drop door 54 and the actuator rotates the drop door shaft 56 into the open position of the door as shown in FIG. 4. The mixed material then is allowed to drop through the outlet 34 past the microwave transmitter 64 and receiver 68. The windows 76,78 protect the microwave transmitter 64 and receiver 68 however, it is understood that the mixture of elastomeric material may coat the windows 67,68 with a coating of up to ¼ of an inch (0.635 cm). In order to account for this, the sensitivity of a microwave receiver 68 may be adjusted to indicate whether elastomeric material is present in the outlet. In that event, the signal is provided for the timer controller 62,84 to prevent closing of the drop door 54.

The timer 62 and controller 84 may be programmed so that when a batch of mixed material is dropped through the outlet 34 a signal is provided for actuating the actuator to close the drop door 54 in preparation for loading a new batch. Alternatively, the timer can be set to provide a delay in closing of the drop door 54 for a predetermined interval of time such as two to four seconds after which the door actuator is activated to close the door providing the microwave transmitter 64,68 indicates there is no material left hanging in the outlet.

What is claimed is:

1. An internal mixer for elastomeric material of the type including a mixing chamber having two rotors with parallel axes of rotation, an inlet opening, an outlet opening, a drop door rotatably supported on a hinge arm for movement into said outlet opening to close said mixing chamber and for movement out of said outlet opening to open said mixing chamber, control apparatus for stopping rotation of said rotors and for releasing said drop door from said outlet opening at a predetermined time, a sensor transmitter and sensor receiver mounted in said outlet opening and connected to said control apparatus to determine the presence of elastomeric material in said outlet opening after said drop door has been released and said drop door being movable into said outlet opening to close said mixing chamber providing no signal has been received by said sensor receiver from said sensor transmitter indicating the presence of said elastomeric material in said outlet opening.

2. The apparatus of claim 1 wherein said sensor transmitter and sensor receiver includes a microwave transmitter mounted on one side of said outlet opening and a microwave receiver mounted on a side opposite to said one side of said outlet opening.

3. The apparatus of claim 2 wherein said internal mixer has a bed plate with said outlet opening in said bed plate and said microwave transmitter and said microwave receiver being mounted on said bed plate at said outlet opening.

4. The apparatus of claim 1 wherein said rotors are mounted on two shafts, proximity switches are mounted on said shafts for determining the relative angular displacement of said two rotors and connected to said control apparatus for stopping rotation of said rotors at certain predetermined positions of said proximity switches for accelerated discharge of said elastomeric material in response to signals from said proximity switches that said predetermined positions have been reached.

5. A method of mixing an elastomeric material in a mixing chamber having two rotors, an inlet opening, an outlet opening and a drop door in said outlet opening comprising closing said outlet opening with said drop door, feeding a batch of said elastomeric material into said mixing chamber, rotating said two rotors for a predetermined period of time, opening said outlet opening by opening said drop door, actuating a sensor transmitter and a sensor receiver in said outlet opening wherein when said receiver receives a signal from said transmitter it indicates said elastomeric material is in said outlet opening, and closing said drop door in response to no signal having been received by said sensor receiver.

6. The method of claim 5, wherein said drop door is connected to a timer for closing said outlet opening at a predetermined time after opening said outlet opening provided said sensor receiver indicates there is no mixed material in said outlet opening.

7. The method of claim 5, wherein said rotors are mounted on two shafts with each of said shafts having proximity switches for determining the relative angular displacement of said rotors comprising the step of stopping rotation of said rotors at a preselected discharge position after said material is mixed.

\* \* \* \* \*